US007860991B2

(12) United States Patent
Ou et al.

(10) Patent No.: US 7,860,991 B2
(45) Date of Patent: Dec. 28, 2010

(54) PACKET CLASSIFIER FOR A NETWORK AND METHOD THEREOF

(75) Inventors: Meng-Hsin Ou, Taipei (TW);
Cheng-Shing Wu, Miaoli County (TW);
Po-Min Wang, Taipei County (TW);
Chien-Hao Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 795 days.

(21) Appl. No.: 11/675,605

(22) Filed: Feb. 15, 2007

(65) Prior Publication Data

US 2008/0154836 A1   Jun. 26, 2008

(30) Foreign Application Priority Data

Dec. 26, 2006   (TW)   ............................... 95148906 A

(51) Int. Cl.
- G06F 15/16    (2006.01)
- G06F 15/173   (2006.01)
- G06F 15/177   (2006.01)
- H04L 12/26    (2006.01)
- H04L 12/28    (2006.01)
- H04L 12/56    (2006.01)

(52) U.S. Cl. .................. 709/230; 709/220; 709/221; 709/222; 709/223; 709/224; 709/225; 709/226; 709/227; 709/228; 709/229; 370/230; 370/230.1; 370/231; 370/235; 370/389; 370/392

(58) Field of Classification Search ......... 709/220–230; 370/230, 230.1, 231, 235, 389, 392
See application file for complete search history.

(56) References Cited

U.S. PATENT DOCUMENTS

| 6,526,066 | B1 * | 2/2003 | Weaver | 370/465 |
| 6,633,563 | B1 * | 10/2003 | Lin et al. | 370/389 |
| 6,697,383 | B1 * | 2/2004 | Li et al. | 370/510 |
| 7,127,510 | B2 * | 10/2006 | Yoda et al. | 709/225 |
| 7,738,461 | B2 * | 6/2010 | Nakamura | 370/392 |
| 2002/0075805 | A1 * | 6/2002 | Gupta et al. | 370/235 |
| 2002/0126672 | A1 * | 9/2002 | Chow et al. | 370/392 |
| 2003/0120795 | A1 * | 6/2003 | Reinshmidt | 709/232 |
| 2003/0123452 | A1 * | 7/2003 | Cox et al. | 370/395.43 |
| 2004/0202178 | A1 * | 10/2004 | Okubo | 370/395.1 |
| 2005/0060418 | A1 * | 3/2005 | Sorokopud | 709/230 |
| 2005/0163121 | A1 * | 7/2005 | Asano | 370/389 |

* cited by examiner

Primary Examiner—Jefferey F Harold
Assistant Examiner—Kai J Chang
(74) Attorney, Agent, or Firm—Jianq Chyun IP Office

(57) ABSTRACT

A packet classifier for a network and the method thereof are provided. The packet classifier includes at least one content locator and one matching engine. Each of the content locators performs at least one location operation. Each of the location operations outputs the sum of at least one accumulation item as an output offset. Each of the accumulation items is generated according to at least one content locator system parameter and/or the content data of a network packet. One of the accumulation items is a base value, and the base value is an offset defined by system parameters or the output offset of a location operations of one of the content locators. The output offset of the last location operation of one of the content locators is the location of a matching field of the network packet. This location is provided to the matching engine for a data matching operation.

14 Claims, 3 Drawing Sheets

PACKET CLASSIFIER FOR A NETWORK AND METHOD THEREOF

CROSS-REFERENCE TO RELATED APPLICATION

This application claims the priority benefit of Taiwan application serial no. 95148906, filed on Dec. 26, 2006. All disclosure of the Taiwan application is incorporated herein by reference.

BACKGROUND OF THE INVENTION

1. Field of the Invention

The present invention relates to a packet classifier for a network and the method thereof, and more particularly to a packet classifier for a network having an extensible and configurable classification mechanism and a practical structure and a method thereof.

2. Description of Related Art

A network based on the Internet Protocol (IP) has a number of network mechanisms that need to classify network packets. Network gateway devices use network packet classifiers to perform specific location operations on packets received from the network to calculate header locations or field locations of the packets. The network packet classifier inspects the contents of specific headers and fields of the packets, and, according to a previously established set of rules, data matching operation is performed and the packets are classified. The network packet classifier determines the method of processing each type of packets, and according to the result of the classification, controls or manages the packets, or provides specific network resources.

With the rapid increase in network services and the rapid progress in networking technologies, the conventional network mechanism needs to be modified. Because the conventional hardware of a packet classifier, which is designed according to existing network protocol standards, is rather fixed, this has a definite impact on the devices for processing network packets. Facing newly added or revised network protocols, it is difficult to modify the conventional hardware in order to readily process new and unfamiliar field locations. For this problem, the industry generally resorts to re-designing a new hardware so that the new field locations can be defined. The conventional hardware structure only allows classification based on fixed fields and provides neither flexible classification mechanism nor extensibility in packet processing. Furthermore, no dynamic adjusting mechanism is provided to respond to new packet fields. Therefore, newly added network protocols or packet types are not supported.

SUMMARY OF THE INVENTION

Accordingly, the present invention provides a packet classifier for a network that locates packet fields to facilitate the matching and classification of specific data and has the flexibility and configurability to support the newest protocols, services and applications. Hence, the packet classifier has greater flexibility in applications. Moreover, because the packet classifier has a superior scalability, it is applicable in more kinds of environments.

The present invention also provides a method for classifying network packets that locates packet fields to facilitate the matching and classification of specific data and has the flexibility to adjust parameters and configuration so as to perform data matching on different types of packet data or fields.

The present invention provides a packet classifier for a network. The classifier includes at least one content locator. Each of the content locators performs at least one location operation. Each of the location operations outputs the sum of at least one accumulation item as an output offset. One of the accumulation items is a base value, and the base value is a first offset or the output offset of one of the location operations of one of the content locators. The output offset of the last location operation of one of the content locators is the location of a matching field of the network packet.

The present invention also provides a method of classifying packets. The method includes performing at least one location operation. Each of the location operations outputs the sum of at least one accumulation item as an output offset. One of the accumulation items is a base value, and the base value is a first offset or the output offset of one of the location operations. One of the output offsets is the location of a matching field of the network packet.

As described in an embodiment of the present invention, the network packet classifier utilizes a mathematical formula model to represent the locations of matching fields in a packet and uses content locators to calculate and find the locations of the matching fields, and then performs the subsequent data matching and packet classification. In addition, the content locators and related hardware can be flexibly combined to implement various mathematical formulas with different degrees of sophistication so that the locations of various packet fields can be calculated. Therefore, using the network packet classifier and its corresponding method of the present invention can increase the flexibility of packet data matching and classification and lower the cost of hardware manufacturing and development.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
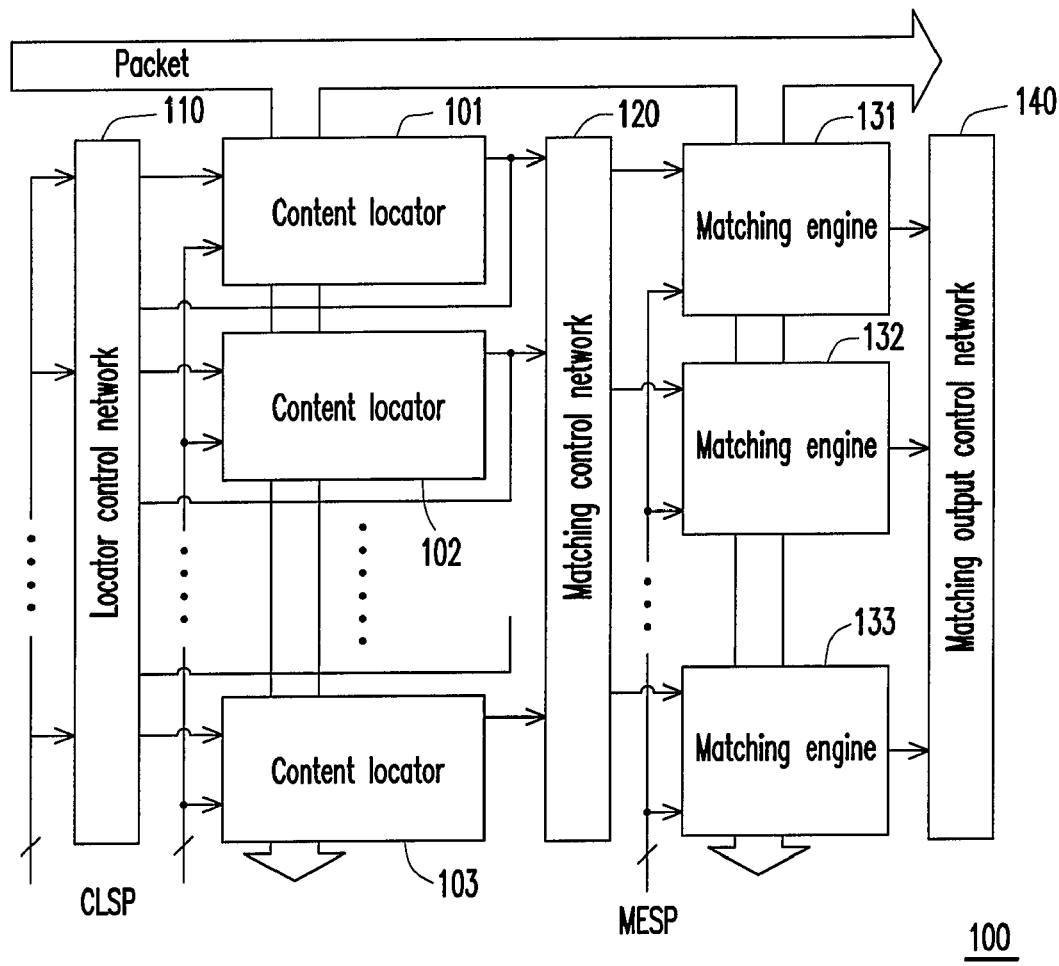
FIG. 1 shows a network-like structure of a network packet classifier according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
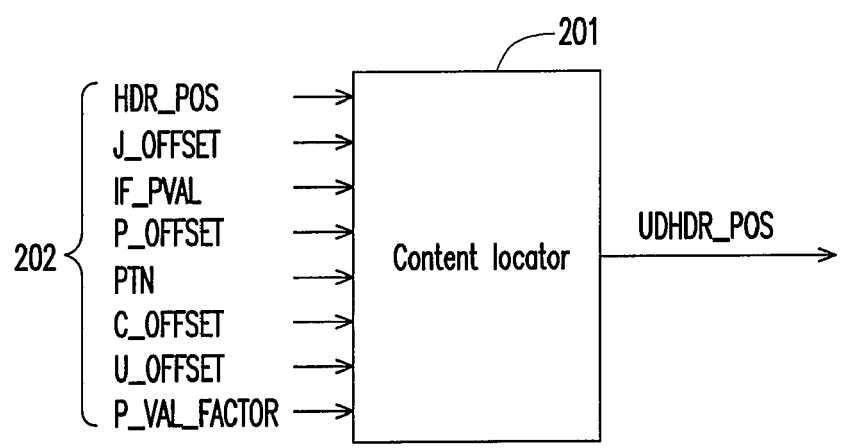
FIG. 2 is a schematic diagram of a content locator according to an embodiment of the present invention.

FIG. 1 is a network-like structure of a network packet classifier according to an embodiment of the present invention. FIG. 2 is a schematic diagram of a content locator according to an embodiment of the present invention. As shown in FIGS. 1 and 2, the network packet classifier 100 includes content locators 101, 102 and 103, a locator control network 110, a matching control network 120, matching engines 131, 132 and 133, and a matching output control network 140. Although only three content locators and three matching engines are shown in FIG. 1, the network packet classifier 100 may be expanded to include any number of content locators and matching engines. The exact number depends on the number of rules required to support the packet classification and the degree of complexity of the fields.

In the present embodiment, the design of the content locators 101, 102 and 103 are identical and the content locator 201 in FIG. 2 is described in more detail. The content locator 201 performs a location operation according to the parameters 202 and outputs an offset UDHDR_POS as the operation result. The offset UDHDR_POS may be the location of the field for data matching in the data packet, regardless of whether it is an existing standard field or a user-defined specific data location. The UDHDR_POS may also serve as a base value to provide to the content locator of the next stage for performing a subsequent operation so as to address the location of the field for carrying out data matching. Each of the content locators 101, 102 and 103 outputs an offset UDHDR_POS, and each content locator in FIG. 1 performs only one location operation when a field location operation is executed.

The output offset UDHDR_POS of the content locator 201, that is, the content of the location operation, is represented by the following mathematical formula:

(Formula 1) UDHDR_POS=HDR_POS+(IF_PVAL*P_VAL_OFFSET)+(C_FLAG*C_OFFSET)+U_OFFSET; a description of the parameters used in formula 1 is given below. UDHDR_POS is the output offset and has an integer value. HDR_POS is the base value of the location operation and has an integer value, and it may be a fixed offset defined by the system parameters or inherit from the output offset of a content locator of a previous stage to serve as the base value. The character of IF_PVAL is Boolean logic and is used for determining whether to use P_VAL_OFFSET parameter, which originates from the content locator system parameters (CLSP). Here, P_VAL_OFFSET represents the offset of the length of the packet header and has an integer value. The character of C_FLAG is also Boolean logic and is used for determining the presence of C_OFFSET whose details would be described below. C_OFFSET is a conditional fixed offset that originates from the CLSP and has an integer value. U_OFFSET is an unconditional fixed offset that also originates from the CLSP and has an integer value.

According to the description of formula 1, the location operations of the content locators 101, 102 and 103 output the sum of at least one accumulation item as the output offset UDHDR_POS. The output offset UDHDR_POS of at least one of the content locators 101, 102 and 103 is the location of a matching field of the network packet.

To complete the action of locating the specific field of a packet, the content locators need a lot of parameters to carry out the location operations. These parameters may come from the CLSP set by the user or from the content data of the network packet. In order for the content locator 201 to locate a specific field, the content of the mathematical formula 1 may further be defined as follows:

$HDR\_POS=(\sim IF\_CAS*FIX\_POS)+(IF\_CAS*PRE\_UDHDR\_POS);$ (Formula 2)

$P\_VAL\_OFFSET=P\_VAL*P\_VAL\_FACTOR,$
wherein $P\_VAL=PKT(HDR\_POS+J\_OFFSET);$ (Formula 3)

$C\_FLAG=(PKT(HDR\_POS+P\_OFFSET)==PTN$ (formula 4)

The related parameters in the foregoing formulas 2 through 4 are further described in the following. IF_CAS indicates whether the content locator is serially connected with the previous content locator, the origin is the CLSP and its character is Boolean logic. FIX_POS is the location of the known header. Its offset is fixed and its origin is the CLSP, and has an integer value. PRE_UDHDR_POS is the base value coming from the content locator of the previous stage, in other words, the output offset UDHDR_POS of the content locator of the previous stage and has an integer value. J_OFFSET is used for obtaining the offset of P_VAL, its origin is the CLSP and has an integer value. J_OFFSET represents the distance from the beginning of a packet to a particular data field. P_VAL_FACTOR is a constant for converting the P_VAL unit, its origin is the CLSP and has an integer value. PTN is a constant for matching with packet data, its origin is the CLSP and has an integer value. P_OFFSET is the location in the packet for data matching with PTN, its origin is the CLSP and has an integer value. Furthermore, the formulas 3 and 4 both have a PKT( ), wherein PKT( ) represent the packet data. For example, PKT(X) represents the data located at an offset distance X from the beginning point of the packet. Furthermore, using the PKT in formula 3 as an example, its means the field content at the location of HDR_POS plus J_OFFSET.

In the present embodiment, the content locators 101, 102 and 103 of the network packet classifier 100 use the mathematical formula 1. According to more advanced definitions shown in formulas 2 through 4, the content locator system parameters (CLSP) that are used include: IF_PVAL, C_OFFSET, U_OFFSET, IF_CAS, FIX_POS, J_OFFSET, P_VAL_FACTOR, PTN and P_OFFSET. The parameters that are dynamically generated or obtained include HDR_POS, P_VAL_OFFSET, P_VAL, C_FLAG and PRE_UDHDR_POS.

The formulas 2 through 4 may be substituted into formula 1 to produce another formula 5. Formula 5 is as follows:

$UDHDR\_POS=(\sim IF\_CAS*FIX\_POS)+(IF\_CAS*PRE\_UDHDR\_POS)+(IF\_PVAL*(PKT(HDR\_POS+J\_OFFSET)*P\_VAL\_FACTOR))+((PKT(HDR\_POS+P\_OFFSET)==PTN)*C\_OFFSET)+U\_OFFSET$ From formulas 1 through 5, the output offset UDHDR_POS of each content locator is the combination of a number of accumulation items, the accumulation items being (~IF_CAS*FIX_POS), (IF_CAS*PRE_UDHDR_POS), (IF_PVAL*(PKT(HDR_POS+J_OFFSET)*P_VAL_FACTOR)), ((PKT(HDR_POS+P_OFFSET+P_OFFSET)==PTN)*C_OFFSET), and U_OFFSET. The field values PKT(HDR_POS+J_OFFSET) and PKT(HDR_POS+P_OFFSET) are taken from the network packet. The logic items, for example, IF_CAS, IF_CAS, C_FLAG and IF_PVAL may be logic values or the negation of logic values. The logic values are taken from the content locator system parameters (CLSP) or generated by judging according to the packet field value. The logic judgement operation defined as equal (==) in the C_FLAG may be changed to non-equal, greater than or smaller than according to the application. The symbol '*' indicates multiplying the item before and after the symbol together.

The locator control network 110 controls the serial connections between the content locators 101, 102 and 103. According to the settings of the CLSP, the locator control network 110 and the content locators 101, 102 and 103 dynamically adjust the serial connection sequence of the content locators. Hence, some of the content locators are able to obtain the required offsets of the previous content locators and use those as the base values for performing a multi-stage location operation so as to address the location of a specific field of a packet.

The destination of the output offset UDHDR_POS of a content locator depends on the serial connection sequence of the content locator. The more lengthy and complicated the mathematical formula for locating a particular field, the more will be the number of stages in the corresponding content locator serial link. For the content locator not in the last stage, its output offset UDHDR_POS will be transmitted to the content locator of the next stage through the locator control network 110 as the base value HDR_POS. For the content locator in the last stage of the serial link, the output offset UDHDR_POS is the location of the field in a packet that needs to be matched. Therefore, the output offset UDHDR_POS is routed to the matching engines 131, 132 or 133 via the matching control network 120 for matching data. The function of the matching control network 120 is to connect the content locators 101~103 to the matching engines 131~133. According to the matching engine system parameters (MESP), the matching engines 131, 132 and 133 perform data matching operations on specific field data at the locations in the network packet corresponding to the received output offsets and output the results of the matching operations.

The matching engine system parameters (MESP) includes target pattern of data matching, length of target pattern, operand used in the data matching operation and mask used in the data matching.

Since the matching engines 131, 132 and 133 outputs a Boolean value, only whether the result of a matching is a success or not is provided. The output results of the matching engine 131, 132 and 133 may be assembled by the matching engine output control network 140 into the output result of a certain matching engine so as to decide whether the network packet fits the classification rules of the network packet classifier 100.

Figure 3:
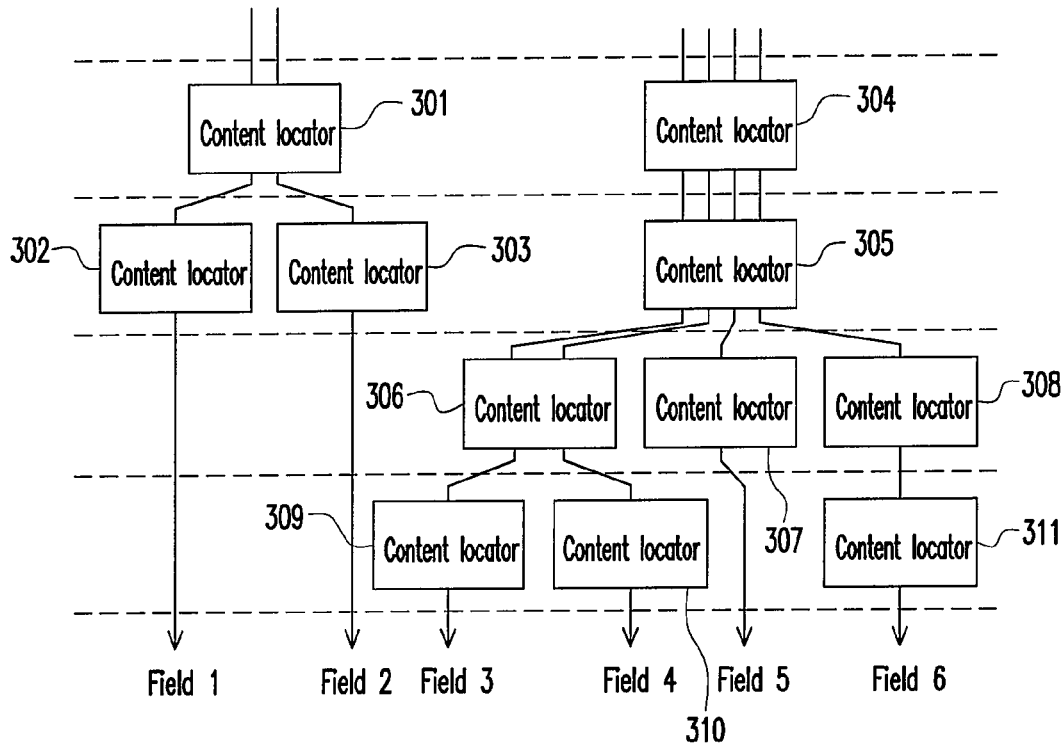
FIG. 3 is a tree-like relation diagram of content locators according to an embodiment of the present embodiment.

FIG. 3 is a tree-like relation diagram of content locators according to an embodiment of the present embodiment. Because the calculating power of one content locator is quite limited, if the mathematical formula for calculating the location of the packet field is too long, a number of serially connected content locators can be used to split up the formula into a plurality of location operations. The location operations are distributed to each one of the content locators in the serial link such that the results of the location operations can be accumulated and eventually the location of a matching field can be calculated. Most packet classifier has many classification rules and some of the classification rules are interrelated. In general, the content locators that need to locate different fields may share a number of common location operations. Since many identical base locations may be found in some of the calculation formula for identifying the fields, the offset being calculated by a certain content locator can be used by a number of lower stage content locators. This is the concept behind the sharing and inheritance of base locations.

Each of the content locators 301~303 in FIG. 3 only performs one location operation. If the address of a specific packet field is required, the results of several content locators are combined. For example, the network packet classifier needs to perform a field matching between two independent fields (field 1 and field 2) on the same third layer (the network layer). The process of locating these two fields requires the calculation of the starting location of the header of the third layer. In other words, the length of the header in the second layer (the data link layer) has to be calculated first. In the embodiment of FIG. 3, the content locator 301 can first be used to calculate the starting location of the header of the third layer as the output offset UDHDR_POS. Then, the content locators 302 and 303 use the output offset of the content locator 301 as the base value HDR_POS and separately calculates the locations of field 1 and field 2. Similarly, the content locators 306~308 use the location operation result of the content locator 305; and, the content locators 309 and 310 use the location operation result of the content locator 306. The tree-like connecting relation of the content locators 301~311 may be implemented using the locator control network 110 in FIG. 1. Thus, the calculation result of a content locator in a previous stage can be used by some of the content locators in subsequent stages and the tree-like serial connection of the content locators is able to save hardware cost. Through the concept of sharing and inheritance, each location in each layer is covered and the number of parameters is minimized.

Figure 4:
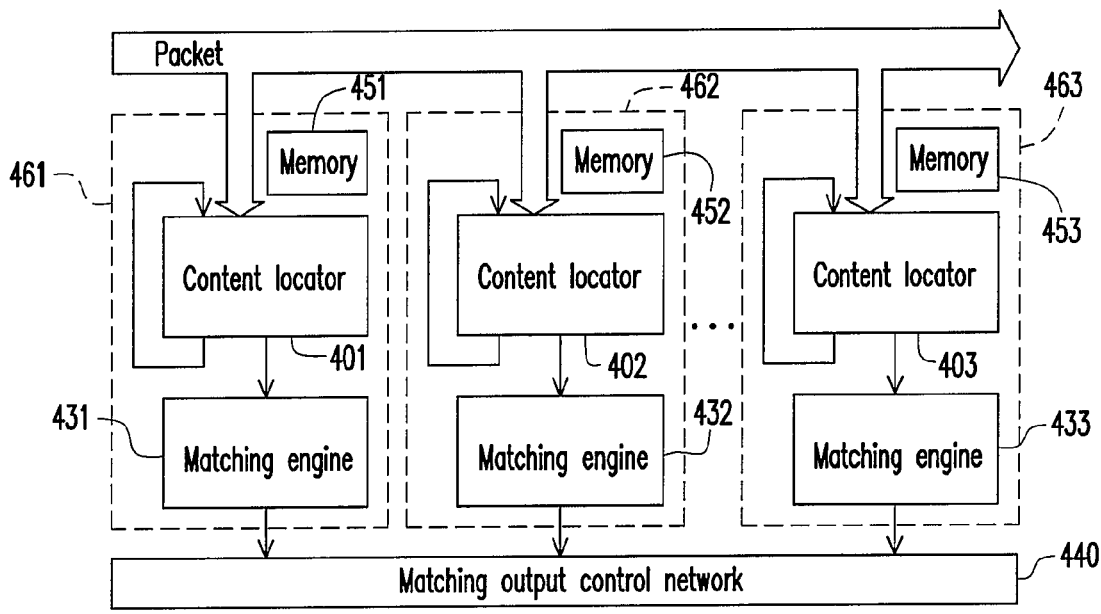
FIG. 4 shows a parallel structure of a network packet classifier according to an embodiment of the present invention.

FIG. 4 is a parallel structure diagram of a network packet classifier according to an embodiment of the present invention. As shown in FIG. 4, the network packet classifier 400 includes content locators 401, 402 and 403, matching engines 431, 432 and 433, matching output control network 440 and rule memories 451, 452 and 453. The content locator, the matching engine and the rule memory of each of the modules 461, 462 and 463 in FIG. 4 are responsible for the calculating formula of an individual matching field.

A parallel structure differs from the network structure in the concept of inheriting the output offset from a content locator in the previous stage as the base value. In the parallel structure, if the location of a certain field requires several location operations, the same content locator is serially connected to form a self-inherit system. In other words, the parallel structure uses an iterative concept. The base value of the first location operation is a pre-determined fixed offset. Thereafter, the base value in each location operation is the offset of the previous location operation.

Using module 461 as an example, the content locator 401 calculates a final output offset and gives it to the matching engine 432 for determination. The final output offset is the location of a matching field in the network packet. The content locator system parameters (CLSP) used by the content locator 401 is stored in the rule memory 451. The rule memory 451 stores the CLSP required by each location operation and the matching engine system parameters (MESP) required by the data matching, and sequentially passes the CLSP to the content locator 401 in each iteration. The content locator 401 outputs the offset to the matching engine 431 in the last location operation so that a data matching at the field location can be carried out. The matching engine 431 performs a data matching according to the matching engine system parameters (MESP). After that, the matching engine 431 outputs the matching result to the matching output control network 440. Thus, the module 461 has completed the matching of data in a field.

The modules 462 and 463 operate in a similar way to the module 461. Each module performs the data matching of a field. The matching output control network 440 performs a Boolean logic operation on the output from one, several or all matching engines to compute a final Boolean value. In other words, several matching results are combined to determine whether they fit the classification rules as expected by the network packet classifier 400.

The network packet classifier with a parallel structure is suitable for a condition in which the location operation results are not shared and may expand the module according to the actual requirements so that each module can support a data matching setting. For example, 512 groups of data matching settings may use 512 modules. In particular, the content locator in each module perform at least one location operation and the parameters required by the content locator and the matching engine in each module is stored in the rule memory inside the module.

For the network packet classifier in the above embodiment, regardless of network or parallel structure, the location of the matching fields can be changed by simply adjusting the content locator system parameters and the locator control network. Hence, there is no need to re-design the entire module and structure. All the content locator system parameters and matching engine system parameters are based on the packet field or data that need to be identified or classification rules defined by the user. The two aforementioned structures may rapidly process a plurality of rules in parallel so that any packet sends to the network packet classifier can be rapidly classified. Moreover, the foregoing network packet classifier with the same level of the two kinds of structures can provide the following location operation functions as well.

Function 1: locate the header location of an existing standard. As shown in formula 6 below, the matching address can be directly obtained as FIX_POS when the field that needs to be identified is an existing field or a known field.

$$HDR\_POS = FIX\_POS \quad \text{(Formula 6)}$$

Function 2: address a custom header location or a header location of a new standard. The custom header location is the aforementioned formula 1, for example.

$$UDHDR\_POS = HDR\_POS + (IF\_PVAL*P\_VAL\_OFFSET) + (C\_FLAG*C\_OFFSET) + U\_OFFSET \quad \text{(Formula 1)}$$

The four groups of accumulation items on the right side of the equal sign of formula 1 are described in more detail in the following.

The first group of accumulation items HDR_POS is the basic value of the location operation such as the formula 2 in the foregoing embodiment.

$$HDR\_POS = (\sim IF\_CAS*FIX\_POS) + (IF\_CAS*PRE\_UDHDR\_POS) \quad \text{(Formula 2)}$$

When the content locator is set up without a serial connection or belongs to the first stage of a serial link, the logic flag IF_CAS is set to FALSE. This implies that there will not be an inherited base value, and the base value is equal to the preset header location FIX_POS. When the content locator is set up with a serial connection, the logic flag IF_CAS is set to TRUE. The base value is inherited from the output offset of the content locator of the previous stage.

The second group of accumulation items (IF_PVAL*P_VAL_OFFSET) is the offset calculated using the field value P_VAL obtained by going forward a fixed J_OFFSET location from the base value, such as formula 3 in the foregoing embodiment.

$$P\_VAL\_OFFSET = P\_VAL*P\_VAL\_FACTOR,$$
$$\text{wherein } P\_VAL = PKT(HDR\_POS+J\_OFFSET) \quad \text{(Formula 3)}$$

P_VAL represents a certain field content that affects the data matching location. For example, when there is a need to perform the location operation of the header starting point of the fourth layer (the transport layer), the header length of the third layer (the network layer) is required to correctly determine the header location of the fourth layer. J_OFFSET indicates the offset to the field needed to find the header length of the third layer. P_VAL represents the value content of the field holding the header length of the third layer. Because the value of the content in the field may not use a single byte as a unit, the location operation may require multiplying with a conversion constant P_VAL_FACTOR in order obtain the correct offset. If P_VAL already uses the byte as a unit, there is no need to multiply by P_VAL_FACTOR, or the P_VAL_FACTOR can be set to one. The content locator system parameter IF_PVAL determines whether there is a need to accumulate P_VAL_OFFSET.

The third group of accumulation items (C_FLAG*C_OFFSET) indicates whether the location obtained by going forward a fixed offset P_OFFSET from the base value location has a specific value PTN such as formula 4 in the foregoing embodiment.

$$C\_FLAG = (PKT(HDR\_POS+P\_OFFSET) == PTN) \quad \text{(Formula 4)}$$

Some fields are unlike P_VAL, which records the header length and offset information. Moreover, certain fields that appear because of packet format or protocol type may affect the calculation for identifying the location of fields. Using the packet of the IEEE 802.1q virtual local area network (VLAN) as an example, P_OFFSET represents the calculation starting form the second layer. To determine if it is the field offset of a VLAN packet, PTN is the condition for recognizing a VLAN packet. In other words, the P_OFFSET can be used to find the type field. PTN is set to 8100 to identify if a packet belong to the VLAN type. Because all the fields after most VLAN tag will have four more bytes of offsets than other types of packets, the offset formed by the VLAN packet is the C_OFFSET, representing a fixed offset arising from certain setup conditions.

The fourth group of accumulation items is unconditional fixed offset U_OFFSET. Certain user-defined data matching fields may utilize U_OFFSET to perform a location operation. For example, to perform a location operation of the tenth byte of the fourth layer, the unconditional fixed offset U_OFFSET may be used to carry out the setting.

Function 3: when the accumulation items of each location operation include a logic decision, the decision operation may be equal to, not equal to, greater than or less than.

To describe the location operation of the network packet classifier of the present invention in greater details, four preferred embodiments are used in the following. FIGS. 5 through 8 are location operation diagrams according to the preferred embodiment of the present invention.

Figure 5:
FIGS. 5 through 8 are schematic diagrams showing location operations according to the preferred embodiments of the present invention.

FIG. 5 shows a location operation of the total length field of a common type of packet. For example, the field requiring location operation is the total length field of the IP header in the third layer. Assume that it is known that the header location FIX_POS is the distance from the beginning of the packet to the header of the third layer, equivalent to fourteen bytes. Assume that it is also known that the packet does not have additional supplementary tag. Because there are no serial connection settings, HDR_POS is directly equal to FIX_POS. Since other fields will not affect the location of the total length field, IF_PVAL is set to FALSE. Furthermore, because the packet has no additional supplementary tag, C_FLAG is set to FALSE without having to consider some specific offset conditions. The location operation of the total length is:

$$UDHDR\_POS = HDR\_POS + U\_OFFSET = FIX\_POS + U\_OFFSET$$

Figure 6:

FIG. 6 shows a location operation on the total length field of a packet type with a VLAN tag. For example, the packet going into the packet classifier includes a VLAN tag as shown in FIG. 6 and the C_FLAG is set to TRUE. The location operation on the total length field has to include the offset generated by the VLAN tag. Assume that it is known that the header location FIX_POS is the distance from the beginning of the packet to the header of the third layer, the location operation of the total length field is:

$$UDHDR\_POS=FIX\_POS+(C\_FLAG*C\_OFFSET)+U\_OFFSET$$

Figure 7:
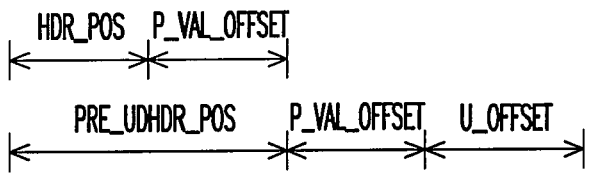

FIG. 7 shows a location operation of a matching field in an application layer of a common type of packet using the concept of inheriting the output offset of the content locator of a previous stage. The content locator of the previous stage adds the header length of the second layer HDR_POS (that is, FIX_POS) to the header length of the third layer P_VAL_OFFSET, and outputs the accumulated result as PRE_UDHDR_POS. The content locator of the next stage inherits PRE_UDHDR_POS as the base value for the next location operation and then adds the header length of the fourth layer P_VAL_OFFSET and the offset of the matching field in the application layer U_OFFSET. The final result is the offset from the beginning of the packet to the matching field. The location operation of the matching field in the application layer is:

$$PRE\_UDHDR\_POS=HDR\_POS+P\_VAL\_OFFSET=FIX\_POS+P\_VAL\_OFFSET;$$

$$UDHDR\_POS=PRE\_UDHDR\_POS+P\_VAL\_OFFSET+U\_OFFSET$$

Figure 8:
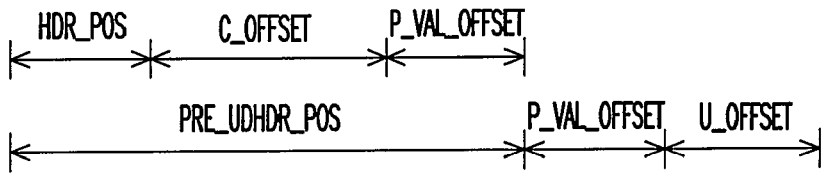

FIG. 8 shows a packet type with a VLAN tag. The content locator required to perform a location operation for locating the matching field in the application layer can similarly inherit the output offset from the content locator of a previous stage. The location operation by the content locator of a previous stage calculates the starting location of the fourth layer. Hence, the content locator of the next stage can accumulate the header length of the fourth layer P_VAL_OFFSET and the unconditional jump offset U_OFFSET to locate the matching field. The location operation of the matching field is:

$$PRE\text{-}UDHDR\_POS=HDR\_POS+C\_OFFSET+P\_VAL\_OFFSET=FIX\_POS+C\_OFFSET+P\_VAL\_OFFSET;$$

$$UDHDR\_POS+PRE\_UDHDR\_POS+P\_VAL\_OFFSET+U\_OFFSET$$

Aside from the network packet classifier in the foregoing embodiment, the present invention also includes a corresponding network packet classification method. Anyone skilled in the art in related areas may be able to implement the network packet classification method of the present invention according to the network packet classifier mentioned in the foregoing embodiments. Hence, a detailed description is omitted here.

It should be noted that the scope of applications of the packet classifier according to the present invention includes two major categories. One type belongs to the area of network control such as packet routing and quality of service (QoS) mechanism. Another type belongs to the area of network security such as the safety mechanism of firewall and Internet service provider (ISP). For data packet classification techniques, the contents that can be inspected by conventional packet classification techniques are limited within the range from the second layer to the fourth layer. In general, the management and control of many services cannot solely rely on the header fields and contents of this layer range. Furthermore, new types of attack on the network keep appearing. The packet classifier in the embodiment of the present invention can be flexibly adjusted and configured in response to the current services and variation of applications. Moreover, it has a corresponding matching recognition mechanism and includes deep packet inspection (DPI). Therefore, the packet classifier has superior flexibility and may be used in hardware devices supporting various network protocols such as network packet processing devices, receiver devices or transmitter devices on the user side, the server side or the router side.

In summary, the network packet classifier and method thereof described in the foregoing embodiments can be used to locate any field in a packet through the setting of the content locator system parameters and the matching engine system parameters. Furthermore, multiple stages of location operations can be serially connected to expand the range and complexity of data matching. Moreover, by configuring the parameter settings, different types of packet matching rules can be implemented. Therefore, the network packet classifier and its corresponding method according to the foregoing embodiments easily support newly added network protocols or packet types and save the time and cost of hardware design and development.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A packet classifier for a network, wherein the packet classifier inspects data contents of headers and fields of network packets received from the network, determines processing methods for each type of the network packets, and classifies the network packets based on the data contents of the fields inspected, the packet classifier for the network comprising:

at least one content locator, wherein each content locator performs at least one location operation on the network packets and each of the location operations outputs the sum of at least one accumulation item as an output offset, wherein each of the accumulation items is generated according to at least one of the content locator system parameters and/or the data contents of one of the network packets, one of the accumulation items is a base value, the base value is a first offset or an output offset of one of the location operations performed by one of the content locators, and the output offset of the last location operation performed by one of the content locators is the location of a matching field in one of the network packets;

at least one matching engine, wherein each of the matching engines receives the output offset of the last location operation performed by one of the content locators, performs a data matching at a location corresponding to the output offset in one of the network packets according to at least one matching engine system parameter, and outputs the result of the data matching operation;

at least a memory module configured for storing the data contents of the network packets, the matching engine system parameter and the result of the data matching operation, wherein determining the processing methods for each type of the network packets and classifying of the network packets based on the data contents of the fields inspected are made according to the result of the data matching operation; and wherein, beside the base value, each of the remaining accumulation items is a second offset, a logic item multiplied by the second offset, the logic item multiplied by a field value, or the logic item multiplied by the field value and multiplied by a first constant, wherein, the first offset, the second offset and the first constant are taken from the content locator system parameters, the field value is taken from one of the network packets, the logic item is a logic value or the inverse of the logic value, the logic value is taken from the content locator system parameters or generated according to the field value.

2. The network packet classifier of claim 1, wherein the field value is the data content at a specific location in one of the network packets, the offset of the specific location is equal to the base value plus a third offset, and the third offset is taken from the content locator system parameters.

3. The network packet classifier of claim 2, wherein the logic value is the result of performing a decision operation according to the field value and a second constant, the second constant is taken from the content locator system parameters and the decision operation is based on the relations of 'equal to', 'not equal to', 'greater than' or 'smaller than'.

4. The network packet classifier of claim 1, further comprising:
a matching output control network, according to the output results of the matching engines, determining whether one of the network packets matches the classification rules of the network packet classifier.

5. The network packet classifier of claim 4, wherein the matching engine system parameters at least comprise one of the following: a target pattern of the data matching operation, length of the target pattern, an operand used in the data matching operation, and a mask used in the data matching operation.

6. The network packet classifier of claim 4, further comprising:
a locator control network for connecting the content locators according to the content locator system parameters in such a way that the content locations are able to obtain the required output offsets as the base values; and
a matching control network connected to the content locators and the matching engines such that the matching engines are able to obtain the required output offsets for performing the data matching operations.

7. The network packet classifier of claim 6, wherein each of the content locators only performs one location operation and the content locators include a first content locator, a second content locator and a third content locator, the base value of the second content locator is the output offset of the first content locator, the base value of the third content locator is also the output offset of the first content locator.

8. The network packet classifier of claim 4, wherein the network packet classifier comprises at least one module, wherein each of the modules comprises one of the content locators and one of the matching engines, the matching engine receives the output offset of the content locator, and if the content locator needs to perform a plurality of location operations, the base value of the first location operation is the first offset, and the base value of each subsequent location operation is the output offset of the previous location operation.

9. The network packet classifier of claim 8, wherein each of the modules further comprises:
a rule memory for storing the content locator system parameters required for the location operations performed by the content locator of the module.

10. A method of classifying network packets, wherein the network packets are received from the network, data contents of headers and fields of the network packets are inspected to determine processing methods for each type of the network packets and to classify the network packets based on the data contents of the fields inspected, the method of classifying the network packets comprising:
performing at least one location operation, wherein each of the location operations outputs the sum of at least one accumulation item as an output offset, wherein each of the accumulation items is generated according to at least one content locator system parameter and/or the data contents of one of the network packets, one of the accumulation items is a base value, the base value is a first offset or the output offset of one of the location operations, and one of the output offsets is the location of a matching field of a network packet, wherein, beside the base value, each of the other accumulation items is a second offset, or logic item multiplied by the second offset, the logic item multiplied by a field value, or the logic item multiplied by the field value and multiplied by a first constant, wherein, the first offset, the second offset and the first constant are taken from the content locator system parameters, the field value is taken from one of the network packets, the logic item is a logic value or the inverse of the logic value, and the logic value is taken from the content locator system parameters or generated according to the field value; and
performing at least one data matching operation such that each of the data matching operations uses the output offset of one of the location operations, wherein the data matching operation is further performed at the location corresponding to the output offset in one of the network packets according to at least one matching engine system parameter.

11. The method of claim 10, wherein the field value is the data content at a specific location in one of the network packets, the offset of the specific location is equal to the base value plus a third offset, and the third offset is taken from the content locator system parameters.

12. The method of claim 11, wherein the logic value is the result of a decision operation according to the field value and a second constant, the second constant is taken from the content locator system parameters and the decision operation is based on the relations of 'equal to', 'not equal to', 'greater than' or 'smaller than'.

13. The method of claim 10, further comprising:
performing at least one data matching operation such that each of the data matching operations uses the output offset of one of the location operations, and furthermore, the data matching operation is performed at the location corresponding to the output offset in one of the network packets according to at least one matching engine system parameter; and
determining whether one of the network packets matches the classification rules of the network packet classification method according to the result of the data matching operation.

14. The method of claim 13, wherein the matching engine system parameters at least comprise one of the following: a target pattern of the data matching operation, length of the target pattern, an operand used in the data matching operation, and the mask used in the data matching operation.

* * * * *